UNITED STATES PATENT OFFICE.

CARL PAAL, OF LEIPZIG, AND CONRAD AMBERGER, OF ERLANGEN, GERMANY, ASSIGNORS TO THE FIRM OF KALLE & COMPANY, AKTIENGESELLSCHAFT, OF BIEBRICH, GERMANY.

OINTMENT CONTAINING COLLOIDAL COMPOUNDS.

1,077,854.     Specification of Letters Patent.     Patented Nov. 4, 1913.

No Drawing.     Application filed May 12, 1913. Serial No. 767,205.

*To all whom it may concern:*

Be it known that we, CARL PAAL, resident of Leipzig, and CONRAD AMBERGER, resident of Erlangen, Germany, both citizens of the German Empire, have invented certain new and useful Improvements in Ointment Containing Colloidal Compounds, of which the following is a specification.

In the specification of the German Patent No. 229306, which relates to a process for the production of salves, or ointment preparations, containing inorganic colloids, wool fat or yolk is incorporated in solutions of metal salts, and these are converted by the addition of suitable agents into oxids, carbonates, basic salts, metals, or free sulfur, and the resulting by-products are removed from the mass. In Example 5 of the said specification the conversion of palladious chlorid into the hydroxid is described, by the action of sodium hydroxid, which is then converted by reducing agents into colloidal metallic palladium. If these processes are applied to the salts of divalent palladium and platinum soluble in water, and if caustic alkalis are caused to react on the said saline solutions ground with wool fat, for the purpose of extracting the therapeutically important hydroxids of the divalent platinum and palladium, the required quantitative mutual decomposition is not obtained, as in the case of other salts of heavy metals such as silver, mercury, and the like. If an excess of caustic alkali be used, a more or less large part of the resulting platinum hydroxid will, according to the amount of the excess of the alkali, be converted, as in the case of aluminium, zinc, or lead hydroxid, into an alkali compound in genuine solution, which will become lost in the purification of the product. Consequently this product shows, according to the conditions under which the investigations are carried out, a fluctuating amount of platinum hydroxid. If, on the other hand, only the calculated amount of caustic alkali be employed, the reaction is incomplete. A part of the salt of platinum used remains uncharged, while another part is converted into the corresponding hydroxid of which a small part again combines with caustic alkali to form a soluble alkali compound, so that even under these conditions of working, a loss of soluble platinum compounds is unavoidable, and a preparation is obtained which again contains a fluctuating amount of hydroxid. Ammonium hydroxid is equally useless, as with it complex compounds are formed.

Now we have found, that by using the carbonates of fixed alkalis for the decomposition of the divalent salts of metals of the platinum group *e. g.* of platinum and palladium, the corresponding hydroxids can be successfully obtained. This result is surprising, because, according to the conditions of experiments under the aforesaid patent, alkali carbonates in the presence of wool fat led to the corresponding colloidal carbonates of heavy metals. A hydrolysis therefore takes place in accordance with the following equation:—

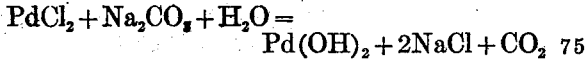

$$PdCl_2 + Na_2CO_3 + H_2O = Pd(OH)_2 + 2NaCl + CO_2$$

This reaction takes place practically quantitative, because, in the purification of the preparation, no loss of platinum compound occurs and wool fat preparations are obtained which contain constant proportions of colloidal $Pd(OH)_2$ or $Pt(OH)_2$, which can be determined in advance when the initial materials used are weighed quantities of platinum salts and wool fat.

It is known (see *Gmelin-Kraut, Handbuch der Anorgan. Chemie*, 1875, vol. 3, p. 1069) that potassium, or sodium, carbonate causes a brown, or black precipitate in the solution of salts of platinum protoxid. This precipitation is not, however, quantitative. The salts of the palladium protoxid behave similarly, the precipitate of $Pd(OH)_2$ produced by potassium, or sodium, carbonate dissolving wholly, or partly, in the excess of the precipitant (*loco citato*, p. 1226). According to the statement of Fischer (*loc. cit.*, p. 1226) alkali carbonates give a precipitate only when they are heated, this precipitate being basic carbonate.

According to the process of the present invention, heat should not be applied, because, under such an application of heat, a separation of wool fat and aqueous liquor at once occurs: further, as hydrated protoxids are to be produced, but no basic carbonates, it would be unlikely that the prior knowledge would lead to the present process, especially as according to the present process, a quantitative decomposition of the divalent platinum, or palladium, salts by potassium, or sodium, carbonate takes place, which is an essential condition for obtaining preparations having a predetermined content. The colloidal preparations thus obtained in which the wool fat, or the wool fat alcohols obtained therefrom by saponification, play the part of the protecting colloid, possess the important property of being absorbed by all the solvents which like ether, petroleum ether, ligroin, liquid paraffin, chloroform, carbon disulfid, fats, ethereal oils, and the like, dissolve wool fat and wool fat alcohols. These preparations are absorbed as organosols one part of the water used as solvent in the preparation, and one part of the alkali salts produced in the reaction remaining undissolved. After the complete dehydration of these organosols by suitable driers, and on using volatile solvents which can be removed by distillation, pure ointment bodies consisting only of inorganic colloid and wool fat, or yolk alcohols, can be obtained.

By repeated treatment of the ointment mass with hot water, the by-products resulting during the formation of the inorganic colloids can also be removed.

The content of colloidal palladium and platinum compounds in the preparations can be enriched by partially precipitating solutions of the products having a definite content of palladium, or platinum, colloid, for instance the solutions in petroleum ether, obtained during the process by an organic liquid in which wool fat, or wool fat alcohols, are difficultly soluble. The surprising result is then obtained that the corresponding colloidal platinum compounds pass quantitatively into the precipitate with a part of the wool fat, whereby they fully retain their colloidal character, so that the precipitations which present a corresponding higher amount of the corresponding platinum, metal, colloid, likewise possess the valuable property of being absorbed in the form of the liquid organosols, by all organic liquids dissolving wool fat or wool fat alcohols.

The following examples will further illustrate how this invention can be carried into practice, but the invention is not limited to the said examples.

*Example 1—Production of a preparation containing 10 per cent. palladium in the form of colloidal palladious hydroxid $Pd(OH)_2$.*—1.7 parts of palladious chlorid ($PdCl_2 = 1$ part Pd) are heated and dissolved in a mixture of 1 part of fuming hydrochloric acid and 2 parts of water, and the cooled solution is intimately triturated in small portions with 9 parts of yolk softened at a low temperature. To the ointment mass now colored red-brown by the palladious chlorid, there is added, also in small portions while constantly triturating, a solution of 2 parts of anhydrous sodium carbonate in 4 parts of water. The carbonate converts the palladious chlorid into palladious hydroxid and the liberated carbon dioxid swells up the ointment mass, which gradually becomes darker. After the whole of the alkali carbonate has been triturated into the mass, it is allowed to stand a considerable time for the purpose of completing the decomposition, and the trituration of the mixture is repeated several times. For the purpose of removing the sodium chlorid produced in the reaction and the small excess of sodium carbonate, the product may be either treated repeatedly with hot water at from 50° to 60° centigrade, and the ointment mass dried *in vacuo* at from 40° to 50° centigrade, for the purpose of removing the water; or the original product may be dissolved in from 5 to 6 times its volume of petroleum ether of low boiling point, the greater part of the by-products remaining undissolved and the red-brown liquid organosol being dried with calcium chlorid or dehydrated sodium sulfate. In this case a further part of the by-products separates along with the water. The petroleum ether is then distilled off from the liquid freed from the drying agent and a preparation is thus obtained which shows a content of colloidal palladious hydroxid ($=13.2$ per cent.), corresponding to 10 per cent. palladium. This content of palladious hydroxid can be enriched in the body produced in the manner described, by precipitation from its solution in petroleum ether, a suitable precipitant for this purpose being alcohol.

In order to obtain a preparation of palladious hydroxid directly at such a high percentage, 9 parts of wool fat are as hereinbefore described triturated with the aforementioned quantities of palladious chlorid solution and sodium carbonate solution and after complete decomposition the mass softened at a low heat is dissolved in petroleum ether of low boiling point, from 50 to 60 parts by volume of ether to 1 part of yolk being used for the purpose. This solution is, as already stated, dried, separated with as little loss as possible of the drying agent by decantation, filtration, and subsequent washing with petroleum ether, the operation being completed by the addition of further petroleum ether to form 100 parts by volume, the resulting solution being then mixed with the same volume of alcohol (100 parts by volume of 96 per cent.) The precipitate of dark-brown flakes and small lumps separates readily from the supernatant yellow solution, which is removed by decantation.

The precipitate is then digested with 100 parts by volume of a mixture of equal parts of alcohol and petroleum ether, the supernatant liquid decanted as much as possible after the settling down of the precipitate, and then digested again in from 30 to 40 parts by volume of alcohol, the precipitate being brought on a filter and washed with cold water until the water which runs out no longer reacts with silver nitrate. The product thus purified is thereupon freed by pressure from adhering water as far as possible, carefully detached from the filter and dried in vacuo at from 40° to 50° centigrade. The substance can be obtained quite pure and dry if it is again dissolved after drying in vacuo in 50 parts by volume of petroleum ether to 1 part of the original wool fat, and allowed to stand for some time with fused calcium chlorid. After distilling off the solvent from 6 to 7 parts of the ointment body are obtained which now contains from 16 to 17 per cent. of palladium corresponding to from 21 to 22 per cent. of palladious hydroxid, which ointment is absorbed as organosol by all organic liquids dissolving yolk.

Products of high content of colloidal palladious hydroxid can also be obtained directly by the process above described without resorting to fractional precipitation, as for instance a preparation with from 20 per cent. palladium, corresponding to 26.4 per cent. palladious hydroxid, when the initial material consisting of 8 parts of yolk is triturated with a solution of 3.4 parts of $PdCl_2 = 2$ parts Pd in 2 parts of concentrated hydrochloric acid and 4 parts of water, in which mass a solution of 4 parts of sodium carbonate in 8 parts of water are stirred, the remainder of the process being carried out as already described.

*Example 2—Production of a preparation containing 10 per cent. platinum in the form of platinous hydroxid.*—As the initial product, platinous chlorid $(PtCl_2)$ in concentrated hydrochloric acid solution is preferably used in which acid solution it exists as readily soluble chloroplatinous acid $$H_2PtCl_4,$$

or sulfite of platinum protoxid may be used, which is obtained by passing gaseous sulfur dioxid through a hot concentrated solution of platinum tetrachlorid $PtCl_4$, or through platinic-chlorid hydrochloric acid $$H_2PtCl_6.6H_2O$$

and subsequent evaporation.

For the preparation of an ointment mass containing 10 per cent. of colloidal platinum in the form of platinous hydroxid, an amount of platinum tetrachlorid $(PtCl_4)$ or platino chlorid hydrochloric acid $$(H_2PtCl_6.3H_2O)$$

(=2.3 parts) corresponding to 1 part of platinum is used as the initial product and the aqueous solution is reduced with sulfur dioxid evaporated to dryness on the water bath and the brown hygroscopic mass is dissolved in 3 parts of water. This solution is then triturated intimately in small portions with 9 parts of wool fat softened at a low heat and then the mass is for the purpose of decomposing the platinum salt into platinous hydroxid again triturated in portions with 2.5 parts of anhydrous sodium carbonate, dissolved in 4.5 parts of water. The platinous salt is decomposed into platinous carbonate $(PtCO_3)$ by the sodium carbonate, which platinous carbonate is spontaneously decomposed in the presence of water into colloidal platinous hydroxid $Pt(OH)_2$ and carbon dioxid. The ointment mass is then further treated as described in the case of the palladium hydroxid. If it be desired to enrich the platinum content in the wool fat preparation, we resort to the aforesaid method of precipitation of the petroleum ether solution. If an ointment mass containing 10 per cent. platinum is the initial material, a product is obtained by precipitation with alcohol, which contains 24 to 25 per cent. of platinum corresponding to from 28 to 29 per cent. platinous hydroxid, which yields with organic liquids dissolving wool fat, the corresponding organosols.

By using larger amounts of the platinous salt as already stated in the case of palladious hydroxid, it is possible to produce directly yolk preparations with larger predetermined percentages of colloidal platinous hydroxid; for example a preparation with 20 per cent. platinum =23.5 per cent. of $Pt(OH)_2$ may be obtained by parting from 4.6 parts of platinic chlorid hydrochloric acid, reducing this by means of sulfur dioxid to the protoxid salt, triturating the salt dissolved in 6 parts of water with 8 parts of yolk, and adding the corresponding amount of concentrated aqueous sodium carbonate (4.5 parts of $Na_2CO_3$: 8 parts $H_2O$) the product thus obtained being separated in the manner already described from the by products and water.

Inasmuch as the wool fat acts in the present process as a protecting colloid, a body preserving the colloidal state of the salts of the metals of the platinum group, other mediums may be employed instead of the wool fat fulfilling the same effect. Thus for instance, the mixture of the wool fat alcohols obtained from wool fat by saponification can be used in the same manner. The wool fat alcohols are in their properties very similar to the wool fat itself and the mixture of alcohols obtained therefrom by saponification presents an even greater affinity for water than wool fat. The wool fat alcohols have a more solid consistency than the wool fat. According as it is desired to obtain preparations of harder or softer quality, the initial material used for the purpose is either a mixture of wool fat alcohols *per se* or their mixture with wool fat, which last mixture is obtained by melting the components together. The production of the ointment preparations is effected in the manner already described. The wool fat alcohols are accordingly considered as the equivalent of the wool fat in the process and product of the present invention.

We claim:

1. Process for the production of preparations containing inorganic colloids, consisting in incorporating with a divalent salt of a metal of the platinum group in solution a protecting colloid, adding a carbonate of an alkali to form the colloidal lower hydroxid of the metal and removing the by-products formed in the process from the resulting preparation.

2. Process for the production of preparations containing inorganic colloids, consisting in incorporating with a divalent salt of a metal of the platinum group in solution a protecting colloid, adding a carbonate of an alkali to form the colloidal lower hydroxid of the metal, dissolving the soft mass, mixing the solution with a liquid sparingly dissolving or not dissolving the protecting colloid and separating the precipitate containing the colloid.

3. Process for the production of preparations containing inorganic colloids, which consists in incorporating with a divalent salt of a metal of the platinum group a protecting colloid, converting such metal into the form of a colloidal hydroxid, and removing the by-products formed in the process from the resulting product.

4. Process for the production of preparations containing inorganic colloids, which consists in incorporating with a divalent salt of a metal of the platinum group wool fat as a protecting colloid, adding a carbonate of an alkali to form the colloidal lower hydroxid of the metal, and removing the by-products formed in the process from the resulting preparation.

5. As new products, preparations consisting of a colloidal lower hydroxid of a metal of the platinum group together with a protecting colloid.

6. As new products, preparations consisting of a colloidal lower hydroxid of a metal of the platinum group together with wool fat constituents as a protective colloid.

7. As new products, preparations consisting of a colloidal lower hydroxid of a metal of the platinum group together with wool fat as a protective colloid.

8. As new products, preparations consisting of colloidal palladious hydroxid together with a protective colloid.

9. As new products, preparations consisting of colloidal palladious hydroxid together with wool fat constituents as a protective colloid.

10. As new products, preparations consisting of colloidal palladious hydroxid together with wool fat as a protective colloid.

In testimony whereof we have signed our names to this specification in the presence of two subscribing witnesses.

CARL PAAL.
    CONRAD AMBERGER.

Witnesses:
    MAX BEESEN,
    HERMANN APITZUBE.